Figure 1:
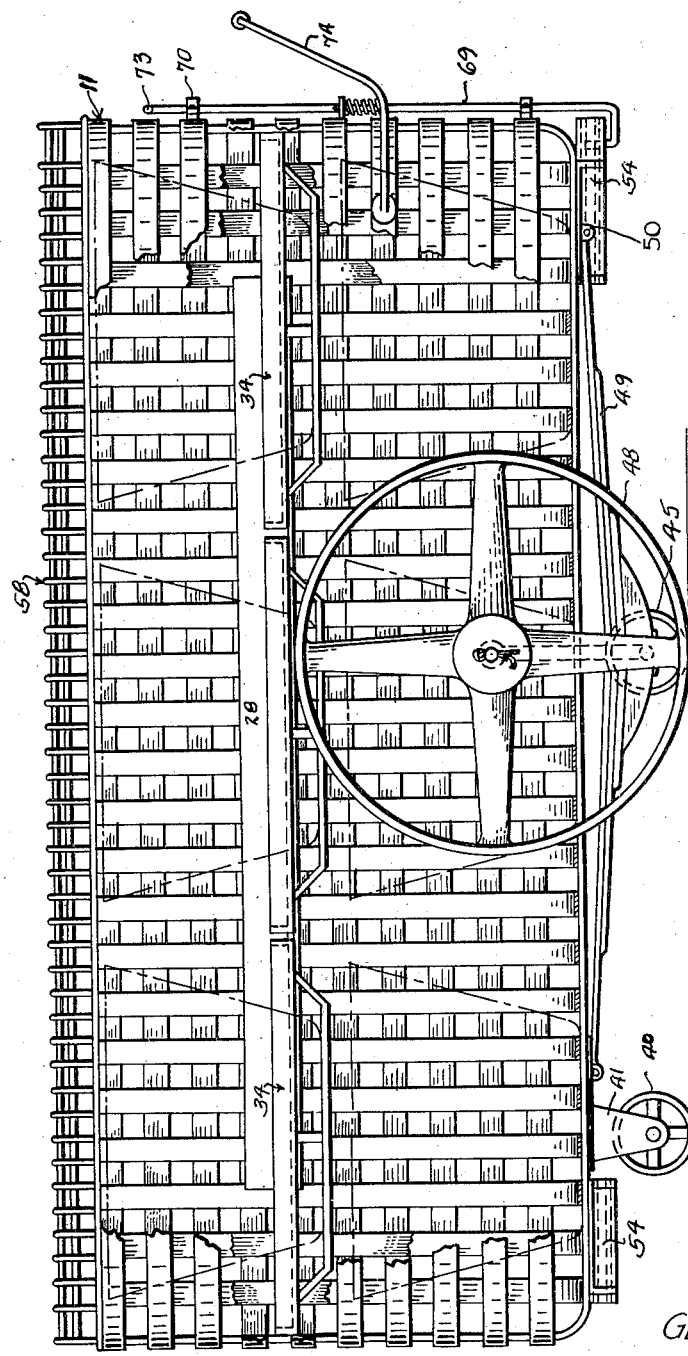

Dec. 28, 1948.  G. SOHA  2,457,742
PUSH CART ASSEMBLY
Filed June 18, 1946  4 Sheets-Sheet 1

Inventor
GEORGE SOHA
By Kimmel & Crowell
Attorneys

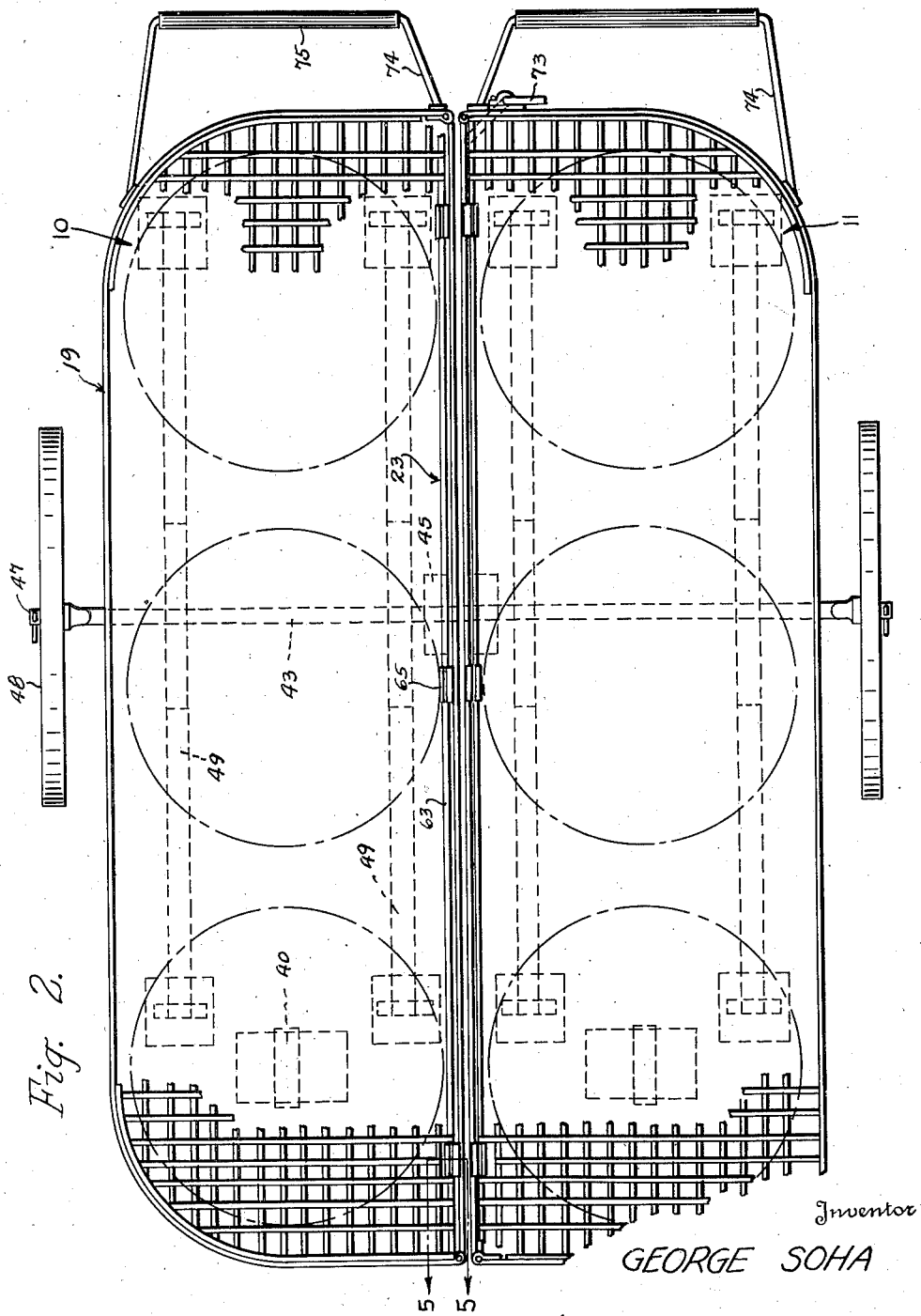

Dec. 28, 1948.    G. SOHA    2,457,742
PUSH CART ASSEMBLY
Filed June 18, 1946    4 Sheets-Sheet 3
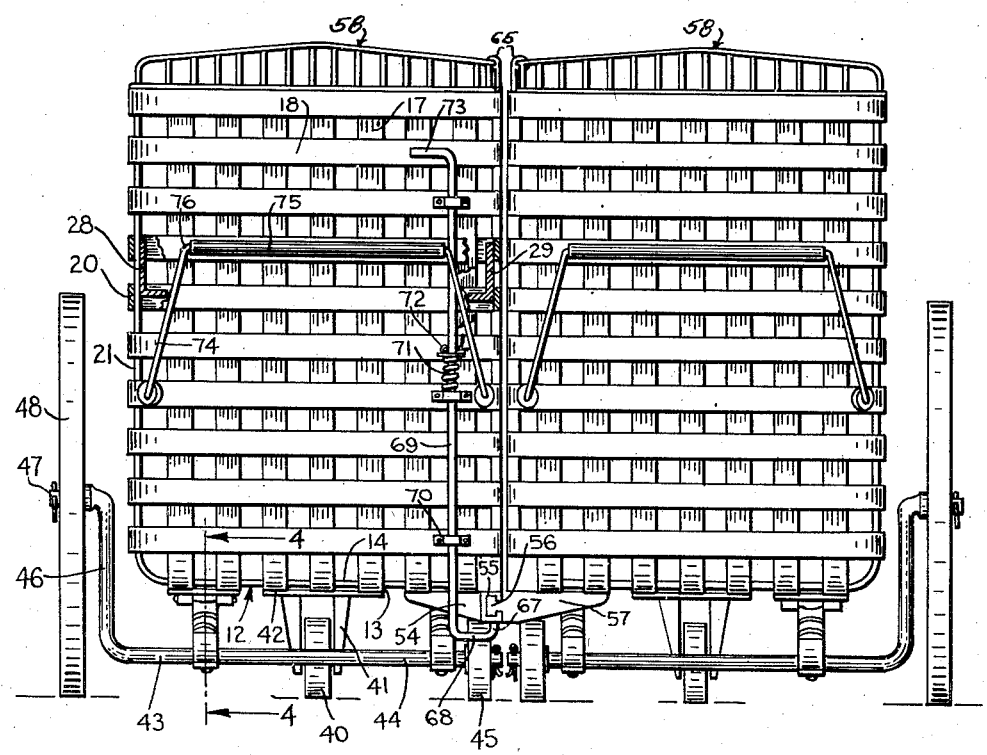
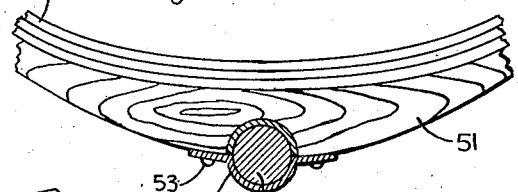
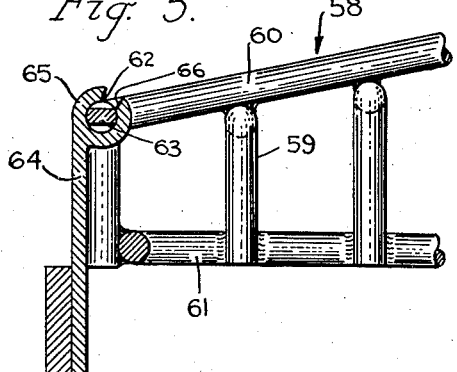
Inventor
GEORGE SOHA
By Kimmel & Crowell
Attorneys Dec. 28, 1948.   G. SOHA   2,457,742
PUSH CART ASSEMBLY
Filed June 18, 1946   4 Sheets-Sheet 4
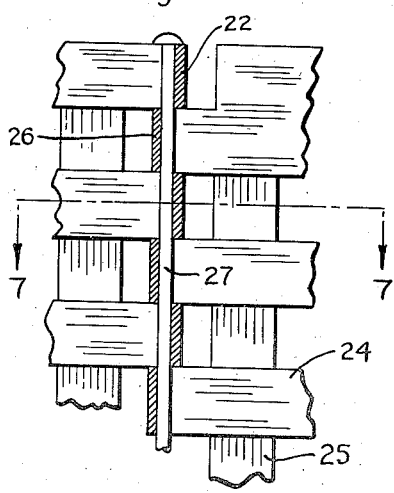
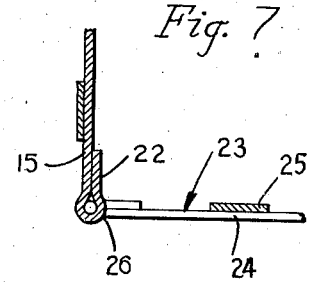
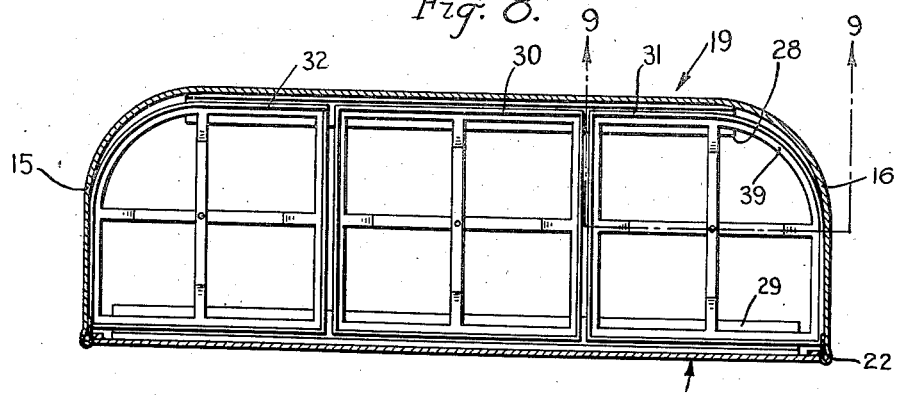
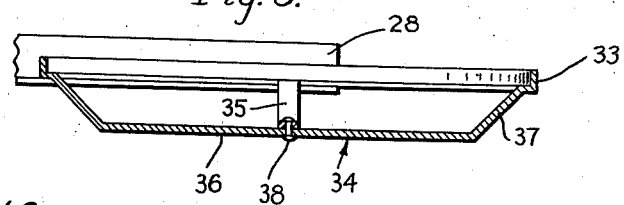
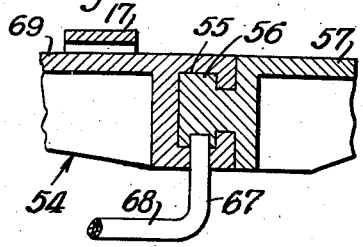
Inventor
GEORGE SOHA
By Kimmel & Crowell
Attorneys

Patented Dec. 28, 1948

2,457,742

UNITED STATES PATENT OFFICE 2,457,742

PUSHCART ASSEMBLY

George Soha, New York, N. Y.

Application June 18, 1946, Serial No. 677,581

2 Claims. (Cl. 280—47)

This invention relates to push carts.

An object of this invention is to provide a push cart for groceries or other articles which embodies a wheeled body and means for supporting articles therein.

Another object of this invention is to provide a push cart of double construction and an improved means for detachably coupling the two elements together so that device may be used with two elements coupled together as a single element.

A further object of this invention is to provide a push cart which is designed for carrying various sizes and types of articles, and includes removable trays whereby packages or articles may be disposed in superposed relation, with the upper packages or articles supported independently of the lower articles.

A further object of this invention is to provide a push cart wherein one wall is readily removable so that when two carts are coupled together a double size body may be formed, or if desired, the adjoining walls may be retained in their normal positions so that the coupled carts will form a double compartment cart.

With the above and other objects in view, my invention consists in the arrangement, combination and details of construction disclosed in the drawings and specification, and then more particularly pointed out in the appended claims.

In the drawings, wherein similar reference characters designate similar parts throughout the respective views, Figure 1 is a detail side elevation, partly broken away, of a push cart assembly constructed according to an embodiment of this invention, Figure 2 is a plan view of the assembly, Figure 3 is a detail rear elevation, partly broken away and in section, of the assembly, Figure 4 is a fragmentary sectional view taken on the line 4—4 of Figure 3, Figure 5 is a fragmentary sectional view taken on the line 5—5 of Figure 2, Figure 6 is a fragmentary sectional view showing the removable connection for an inner side wall, Figure 7 is a fragmentary sectional view taken on the line 7—7 of Figure 6, Figure 8 is a horizontal section taken through one of the push cart members, Figure 9 is a fragmentary sectional view taken on the line 9—9 of Figure 8, and Figure 10 is a fragmentary detail section showing the engagement of the locking bolt with the locking members.

Referring to the drawings, the numerals 10, 11 designate generally a pair of push cart members of complementary construction which are adapted to be detachably coupled together as will be hereinafter described. The two push cart members 10, 11, are of like construction and the detailed description of one of these members will apply equally as well to the other member.

The push cart member 10 includes a bottom wall generally designated as 12, which is formed of spaced longitudinal straps 13, and transverse straps 14. The straps 13 are disposed in spaced parallel relation, and the straps 14 are also disposed in spaced parallel relation and are adapted to be welded at their crossing points to the longitudinal straps 13 so as to thereby form a perforate bottom wall.

The body 10 also includes opposite end walls 15, 16, which are formed of vertical parallel straps 17 and horizontal parallel straps 18 which may be welded or otherwise firmly secured at their crossing points to the vertical straps 17. In practice the straps 17 may be formed integral with the bottom longitudinal straps 13.

The body 10 also includes an outer side wall 19 which is formed of horizontal longitudinal straps 20 formed integral with the horizontal end straps 18, and is also formed of vertical straps 21 which may be formed integral with the transverse bottom straps 14. The straps 20, 21 are secured together at their crossing points as by welding or other suitable fastening means.

The inner vertical edges of the end walls 16 are formed with eyes 22 whereby the inner side wall or partition generally designated as 23 may be detachably secured to the end walls 15, 16. The partition 23 is formed of horizontal and vertical crossed straps 24, 25 respectively, and the ends of the horizontal straps 24 are formed with eyes 26 engageable between the eyes 22 and adapted to register with the latter for removably receiving a headed coupling pin 27 which is extended from above through the registering eyes 22, 26. The body 10 is, as hereinbefore described, formed of basketlike configuration which is open at the top so that the desired articles may be placed into the interior thereof.

In order to provide a means for supporting articles in superposed and independent relation, I have provided a horizontally disposed angle member 28 which is fixed to the inner side of the outer side wall 19, and a second angle member 29 is disposed in confronting relation with respect to the angle member 28 and is fixed as by welding or the like to the inner side wall or partition 23. The two angle members 28, 29 extend substantially throughout the length of the sides 19, 23, and a plurality of trays are adapted to removably engage on the supporting bracket or angle members 28, 29. In the present instance there are three of these trays, one tray being designated 30 and constituting an intermediate tray which is of square or rectangular configuration in plan. Opposite end trays 31, 32, which are of like construction, engage on the supporting members 28, 29 outwardly from the middle of the intermediate tray 30. These trays are formed of an angle frame member 33, which is bent to substantially rectangular configuration, and which has extending downwardly therefrom crossed connecting straps 34, 35.

The strap 34 includes a horizontal intermediate portion 36 and upwardly and outwardly extending end portions 37 which are adapted to be welded or otherwise firmly secured to the horizontal side of the angle frame member 33. The straps 34, 35, are of like construction and are secured together at their crossing points by fastening means 38. The end tray members 31, 32, are similar to the intermediate tray members 30, with the exception that the angle frame 33 at one corner, is formed on a curve as indicated at 39.

The body has mounted therebeneath a forward wheel 40 which is supported between a pair of depending ears or arms 41 carried by a plate 42 which is welded or otherwise firmly fixed to the bottom wall 12 in the transverse median thereof adjacent the forward end of the body. The body 10 is also supported through the medium of an L-shaped axle 43. The axle 43 includes a horizontal lower side 44 extending beneath the body 10 and having journaled on the free end thereof a small wheel 45. The axle 43 also includes outer vertical sides 46 terminating in a horizontal trunnion 47 on which a large diameter wheel 48 is rotatably mounted.

The horizontal side 44 of the axle 43 is resiliently secured to the under side of the body 10 by means of a semi-elliptical spring 49 which has secured adjacent the opposite ends thereof shackles 50 which are carried by the bottom wall 12. Preferably a longitudinally curved wooden block 51 is interposed between spring 49 and the horizontal axle member 44 and a clamping member 52 is secured to the block 51 by fastening members 53.

The two bodies 10, 11 are adapted to be detachably coupled together for operation as a single unit by means of a socket member 54 which is fixed to the bottom of the body 10, there being at least two of these socket members 54, and each having a socket 55 of substantially T-shape. A T-shaped coupling member 56 carried by a supporting member 57 is fixed to the bottom of the body 11, there being as many coupling members 56 as there are sockets 54. In the present instance there is a socket member 54 at each end of the body 10, and the body 11 also has a similar number of such T-shaped coupling members.

A closure generally designated as 58 is hingedly carried by the inner side wall 23. The closure 58 includes longitudinally disposed inverted U-shaped bars 59 which are welded or otherwise fixed to the under sides of transversely disposed parallel substantially inverted U-shaped bars 60. The lower ends of the free legs of the U-shaped members 59, 60 are welded or otherwise fixed to a rectangular bottom bar 61. The closure 58 also includes an inner horizontally disposed hinge bar 62 which is formed with spaced flattened portions 63. The inner side wall 23 has extending upwardly therefrom a plurality of supporting straps 64 on the upper ends of which are fixed hinged barrels 65 which are open as at 66. By making the hinged barrels open the flattened portion 63 of the pintle or hinge bar 62 can be readily removed from or inserted in the hinged barrels.

In order to removable lock the two cart members together, I have provided a vertically disposed and upwardly extending locking bolt 67. The bolt 67 is adapted to extend upwardly through the socket 54 and to engage in the T-shaped coupling member 56 so that the two coupling members 54, 56 will be firmly locked together. The bolt 67 is formed as an integral part of a horizontally disposed extension 68 carried by a vertical bolt operating rod 69. The rod 69 is slidable in guides 70 which are carried by the rear wall 16 of the body 10. The rod 69 is constantly urged upwardly to bolt locking position by means of a spring 71 which engages at one end against one of the guide members 70, and at the other end against a washer 72 which is fixed relative to the rod 69.

The upper end of the rod 69 is formed with a right angular handle 73 so that the rod can be readily moved downwardly, and if desired, the rod 69 may be rotated after the bolt 67 has been withdrawn from the socket member 54 so as to hold the bolt 67 in disengaged position with respect to the socket 54. The body 10 has fixed to the rear wall thereof an upwardly and rearwardly extending bail or handle 74 having a horizontal handle member 75 mounted on the bight 76 thereof.

In the use and operation of this cart where only one cart is to be used, the articles may be placed in the bottom wall of this cart and if additional articles are to be placed in the cart in superposed spaced relation, the trays 31, 32 may be mounted on the supporting inner members 28, 29. These additional articles may then be placed in the trays. The closure or lid is initially raised to permit insertion of the articles and may be lowered to the closed position when the cart is in use.

By providing each cart with an L-shaped axle, and with the smaller wheel on the horizontal side of the axle being positioned beneath the bottom of the cart, it is possible to readily couple two of these carts together as a unit. This is accomplished by placing the two carts in substantially side by side relation and then moving the keys or coupling members 56 into the socket members 54. After the coupling members are in engaged position, the bolt 67 may be swung to a position for spring pressed movement upwardly through the socket 54 into the coupling member 56. In this manner the two complementary carts will be locked firmly against lateral or endwise movement so that they can be operated together as a unit.

The bodies of these carts are disclosed as being of perforate construction and having crossed straps forming the walls thereof. It will, of course, be understood that if desired these straps may be interwoven after the manner of woven baskets. These carts are of sufficient size so that at least three bushel baskets may be placed along the length thereof and when the shelves are in position, additional baskets such as bushel baskets or other packages or articles may be supported above the lower baskets or packages.

I do not mean to confine myself to the exact details of construction herein disclosed, but claim all variations falling within the purview of the appended claims.

What I desire to claim is:

1. In a push cart assembly comprising a pair of mobile cart members each having a body and supporting wheels, a plurality of T-shaped socket members carried by one of said cart members, a plurality of T-shaped coupling members carried by the other cart member and engageable in said socket members, a spring-pressed bolt for locking a T-shaped coupling member in the socket, an upwardly extending operating rod formed integral with said bolt and including a right angular lower end, said bolt extending upwardly from said lower end, and means slidably mounting said rod on an end of said body.

2. In a push cart assembly having a pair of mobile cart members each having a body and supporting wheels, longitudinally disposed T-shaped socket members and correlated T-shaped coupling members engageable in said socket members carried by the cart members, a locking bolt for locking a T-shaped coupling member in a socket, an upwardly extending operating rod slidably mounted on an end of one body, spring means biasing said operating rod upwardly on the body, a right angular lower end on said rod fixed between said rod and said locking bolt whereby downward movement of the operating rod against the spring tension will effect the unlocking of the coupling members.

GEORGE SOHA.

REFERENCES CITED

The following references are of record in the file of this patent:

UNITED STATES PATENTS

| Number | Name | Date |
|---|---|---|
| 517,666 | Segrest | Apr. 3, 1894 |
| 559,966 | Bierstadt | May 12, 1896 |
| 1,063,884 | Kern | June 3, 1913 |
| 1,156,693 | Koger | Oct. 12, 1915 |
| 1,229,465 | Hudson | June 12, 1917 |
| 1,283,591 | Steendahl | Nov. 5, 1918 |
| 1,707,186 | Chatfield | Mar. 26, 1929 |
| 2,046,206 | Ose | June 30, 1936 |
| 2,140,132 | Hollett | Dec. 13, 1938 |
| 2,371,811 | Ericsson | Mar. 20, 1945 |
| 2,389,574 | Hulquist | Nov. 20, 1945 |